US005762325A

United States Patent [19]

Blatt

[11] Patent Number: 5,762,325

[45] Date of Patent: Jun. 9, 1998

[54] POWER ACTUATED GRIPPER

[75] Inventor: John A. Blatt, Grosse Pointe Farms, Mich.

[73] Assignee: ISI Norgren Inc., Anoka, Minn.

[21] Appl. No.: 593,007

[22] Filed: Jan. 29, 1996

[51] Int. Cl.$^6$ .................................... B23Q 3/08

[52] U.S. Cl. .................... 269/32; 269/229; 269/228

[58] Field of Search ........................ 269/20, 27, 32, 269/34, 229, 140, 142, 145, 235, 271, 234, 228

[56] References Cited

U.S. PATENT DOCUMENTS

| | | | |
|---|---|---|---|
| 492,931 | 3/1893 | Baird | 269/234 |
| 770,270 | 9/1904 | Dehn | 269/234 |
| 1,797,836 | 3/1931 | Paul | 269/229 |
| 2,126,767 | 8/1938 | Gibbons | 18/18 |
| 2,140,658 | 12/1938 | Van Sittert | 269/234 |
| 2,212,332 | 8/1940 | Van Sittert et al. | 269/32 |
| 2,229,800 | 1/1941 | Dean | 294/106 |
| 2,908,114 | 10/1959 | Fouse | 269/34 |
| 2,913,941 | 11/1959 | Verderber | 81/17.2 |
| 3,120,046 | 2/1964 | Olsen | 24/248 |
| 3,139,302 | 6/1964 | Orloff et al. | 294/88 |
| 3,170,322 | 2/1965 | Cavanaugh | 269/34 |
| 3,302,944 | 2/1967 | Fricks | 269/162 |
| 3,371,953 | 3/1968 | Blatt | 294/88 |
| 3,381,954 | 5/1968 | Blatt | 269/32 |
| 3,567,208 | 3/1971 | Blatt | 269/32 |
| 3,630,391 | 12/1971 | Wilson | 269/32 |
| 3,782,162 | 1/1974 | Bullard | 72/250 |
| 4,009,630 | 3/1977 | Ekholm | 83/369 |
| 4,384,707 | 5/1983 | Poot | 269/217 |
| 4,395,027 | 7/1983 | Nordmeyer | 269/32 |
| 4,576,367 | 3/1986 | Horn et al. | 269/229 |
| 4,641,877 | 2/1987 | Merrill | 294/101 |
| 4,664,364 | 5/1987 | Lymburner | 269/32 |
| 4,721,293 | 1/1988 | Schron et al. | 269/32 |
| 4,834,442 | 5/1989 | Choung | 294/101 |
| 4,867,428 | 9/1989 | Fricker | 269/134 |
| 4,887,803 | 12/1989 | Witt | 269/32 |
| 4,901,991 | 2/1990 | Bonkowski | 269/234 |
| 4,905,973 | 3/1990 | Blatt | 269/32 |
| 4,958,813 | 9/1990 | Dykstra | 269/32 |

FOREIGN PATENT DOCUMENTS

| | | | |
|---|---|---|---|
| 1187981 | 10/1985 | U.S.S.R. | 269/34 |

*Primary Examiner*—Robert C. Watson
*Attorney, Agent, or Firm*—Young & Basile, P.C.

[57] ABSTRACT

A power actuated gripper for engaging and holding a workpiece wherein a cam surface is pivotally linked to a reciprocating actuator for actuating at least one of a first and second jaws between a clamped position, wherein the first and second jaws engage and hold the workpiece, and an unclamped position, wherein the first and second jaws disengage and release the workpiece. The reciprocating linear actuator provides a fluid motor with a piston and piston rod for providing linear reciprocal movement. The piston rod is connected to a coupling member which is pivotally connected to a pair of linkage members for each of the first and second jaws. A pair of lever arms are pivotally connected to the linkage members and are integral with a shaft link. The cam surface is formed on the shaft link and actuates a cam follower, biased toward the cam surface, connected to the first and second jaws. The first jaw moves linearly between the clamped and unclamped positions, and the second jaw provides a linkage portion and a swing arm wherein the linkage portion has a linear moving portion linked to the swing arm. The swing arm is rotatably connected to the pivot pin for simultaneous rotary movement with the pivot pin. A pair of microswitches contact the pivot pins connecting the linkage member and the lever arms to sense when the gripper is in the clamped and unclamped positions.

15 Claims, 4 Drawing Sheets

POWER ACTUATED GRIPPER

FIELD OF THE INVENTION

The present invention relates to power actuated grippers, and more particularly, to a pneumatically operated fluid motor type power gripper having a reciprocating linear actuator coupled to a mechanical linkage and camming mechanism for actuating a pair of jaws between a clamped and unclamped position.

BACKGROUND OF THE INVENTION

Power jaw-type grippers are known to be of the type in which a fluid motor provides reciprocating movement to a mechanical linkage for actuating the jaw-type grippers. Normally, the fluid motor retracts the reciprocating actuator, and through a mechanical linkage, the jaws of the gripper move or pivot away from one another thus releasing and disengaging a workpiece. When the fluid motor actuates the reciprocating actuator toward a clamped position, the mechanical linkage drives the jaws of the gripper toward one another to engage and hold the workpiece.

Various mechanical linkages have been proposed to correctly translate reciprocating movement of a piston and piston rod to optimize the clamping force of the gripper jaws by seeking to obtain the highest mechanical advantage which can be utilized by the power stroke of the fluid motor and the mechanical linkage of the power gripper. All of these known mechanisms, more or less, include complex designs of various mechanical components at high manufacturing and assembly cost.

Occasionally, the clamping forces generated by the mechanical linkage of the power gripper are not sufficient as the work performed on the workpiece may generate or apply forces to the workpiece which are greater than the gripping forces applied by the gripper. Thus, when the gripper cannot engage and hold the workpiece in a stationary position, the workpiece moves relative to the power gripper, and all references and datums which are established for processing, machining and assembly are lost.

In one such example, conventional power actuated grippers are utilized to hold a workpiece in a stationary manner while the workpiece is welded at predetermined locations. After the welder has welded the workpiece, it is common for the tip of the welder to stick to the workpiece. Thus, when a robotic arm moves the clamped grippers with the workpiece, the adhesion forces of the welder to the workpiece may be greater than the gripping force on the workpiece. Therefore, the workpiece may move relative to the grippers when the workpiece is pulled away from the welders. It would be desirable to provide a power actuated gripper that provides extremely high gripping forces without damaging the workpiece.

SUMMARY OF THE INVENTION

The present invention provides a power actuated gripper for engaging and holding a workpiece wherein a reciprocating actuator drives a cam means for actuating at least a portion of an opposing gripping means between a clamped position, wherein the opposing gripping means engages and holds the workpiece, and an unclamped position, wherein the opposing gripping means disengages and releases the workpiece. The cam actuating means provides at least one cam surface for engaging at least a portion of the opposing gripping means while a pivotal linking means connects the cam surface to the reciprocating actuator.

The pivotal linking means provides a coupling member that is connectible to the reciprocating actuator. At least one linkage member has opposite ends with one of the opposite ends pivotally connected to the coupling member, and the other of the opposite ends is connected to at least one lever arm. The lever arm is integral with a shaft link which carries the cam surface and is pivotally mounted to the housing for pivotal movement about a common axis. The linkage member and the lever arm have longitudinal axes which remain at an acute angle with respect to one another to prevent the linkage member from reaching an over-center position with respect to the lever arm when moving between the clamped and unclamped positions. A sensing means senses the position of the pivotal linking means in at least one of the clamped and unclamped positions.

The opposing gripping means has at least one cam follower for following the cam surface. A biasing means biases the cam follower toward the cam surface thus biasing the opposing gripping means toward the unclamped position.

The opposing gripping means provides a first jaw and a second jaw wherein the first jaw is partially disposed within the housing for movement along a predetermined linear path between the clamped position and the unclamped position. The second jaw provides a linkage portion connected to the cam follower for movement along a predetermined path between the clamped and unclamped positions and a swing arm pivotally connected to the linkage portion and rotatably coupled to the shaft link for rotating the swing arm with the shaft link. The linkage portion and the swing arm cooperatively engage for simultaneous movement of the second jaw between the clamped and the unclamped positions.

Thus, the objects of the invention are to provide a new and improved power actuated gripper that provides a high level of gripping force.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
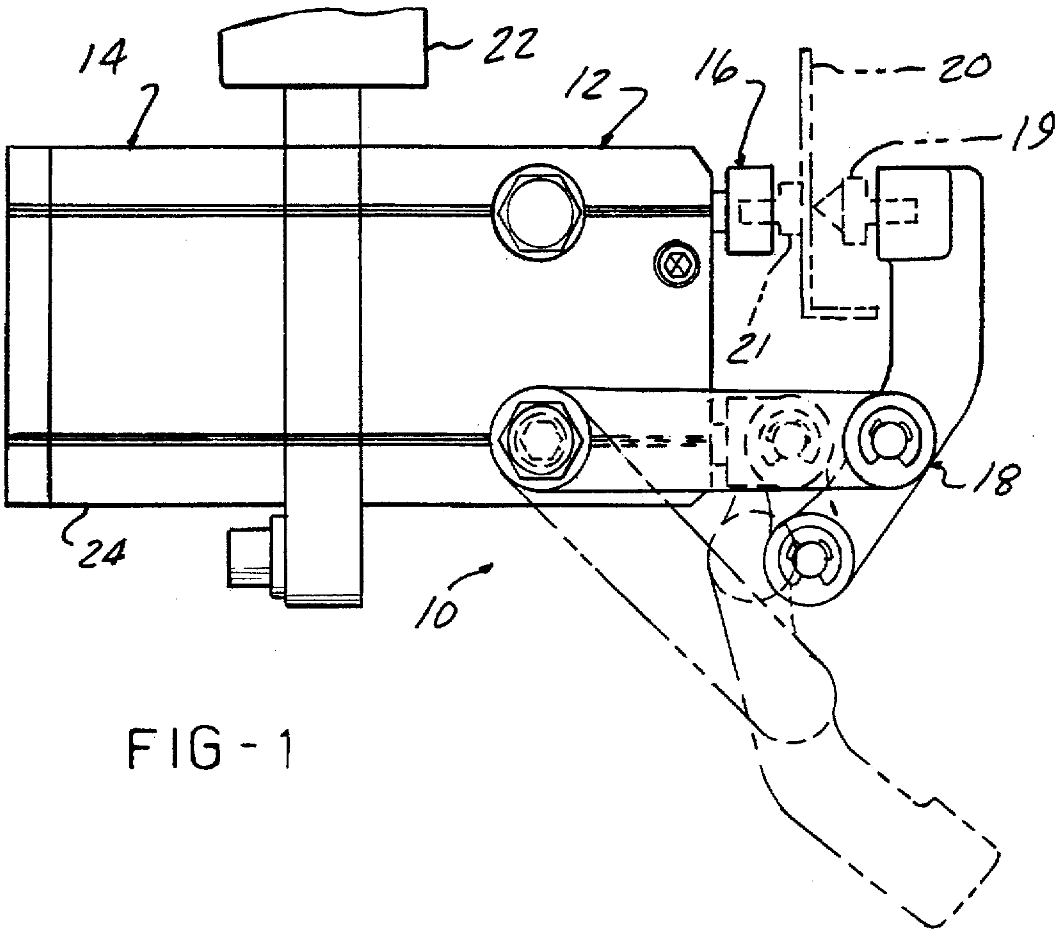
FIG. 1 is a front view showing the gripper in the clamped position and showing, in phantom, the second jaw of the gripper in the unclamped position.
Figure 2:
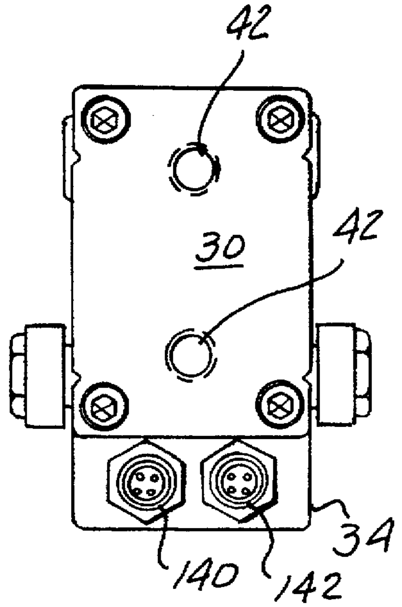
FIG. 2 is an end view of the gripper showing the end cap and the cable receptacles for the microswitches.

FIG. 1 shows a power actuated gripper 10 according to the present invention. The gripper 10 provides an enclosed hollow housing 12 connected to a linear reciprocating actuator 14. A cam actuating means is pivotally connected to the reciprocating actuator 14 and actuates at least a portion of an opposing gripping means. The opposing gripping means provides a first jaw 16 and a second jaw 18 for movement between a clamped position, wherein the first and second jaws 16, 18 engage and hold a workpiece 20, and an unclamped position, wherein the first and second jaws 16, 18 disengage and release the workpiece 20. Gripper points 19 and concave inserts 21 may be connected to the first and second jaws 16, 18 for severe industrial applications. A mount 22 extends from an adapter plate 34 of the power actuated gripper 10 between the reciprocating actuator 14 and the housing 12 and is received by a mounting bracket (not shown) of a programmable robotic arm (not shown). The mount 22 may be spherical, rectangular, or any other conventional clamp or gripper mount that may be well known to one skilled in the art.

To provide linear reciprocal movement, the reciprocating actuator 14 of the power actuated gripper 10 provides a fluid cylinder 24 connected to the housing 12, as seen in FIGS. 1, 2, 4–7. The fluid cylinder 24 has an elliptical bore 26 extending through the cylinder 24 along a longitudinal axis 28 of the power actuated gripper 10. An end cap 30 is sealingly fastened to the free end of the cylinder 24 to enclose and form a piston chamber 32, and the adapter plate 34 is sealingly fastened to the other end of the cylinder 24. A piston 36 is sealingly and slidingly disposed within the piston chamber 32, and a piston rod 38 is attached to the piston 36 and extends longitudinally from the fluid cylinder 24 into the housing 12. The piston rod 38 extends through a bushing 40 mounted between the housing 12 and the cylinder 24 to support linear reciprocal movement of the piston rod 38 along the longitudinal axis 28 of the power actuated gripper 10.

The cylinder 24 has first and second fluid inlets 42 provided in the end cap 30 of the reciprocating actuator 14. The fluid inlets 42 remain in communication with the piston chamber 32 on opposite sides of the piston 36, and, as is well known in the art, are suitably connected by conduits (not shown) to a source of pressurized fluid (not shown). Preferably, a pressurized air source (not shown) is connected to the first and second inlets 42 in order to create a feed and bleed pneumatic linear actuator 14. Alternatively, hydraulic fluid may be utilized as a fluid medium or any other type of fluid medium that may provide for a sufficient linear actuator.

Figure 4:
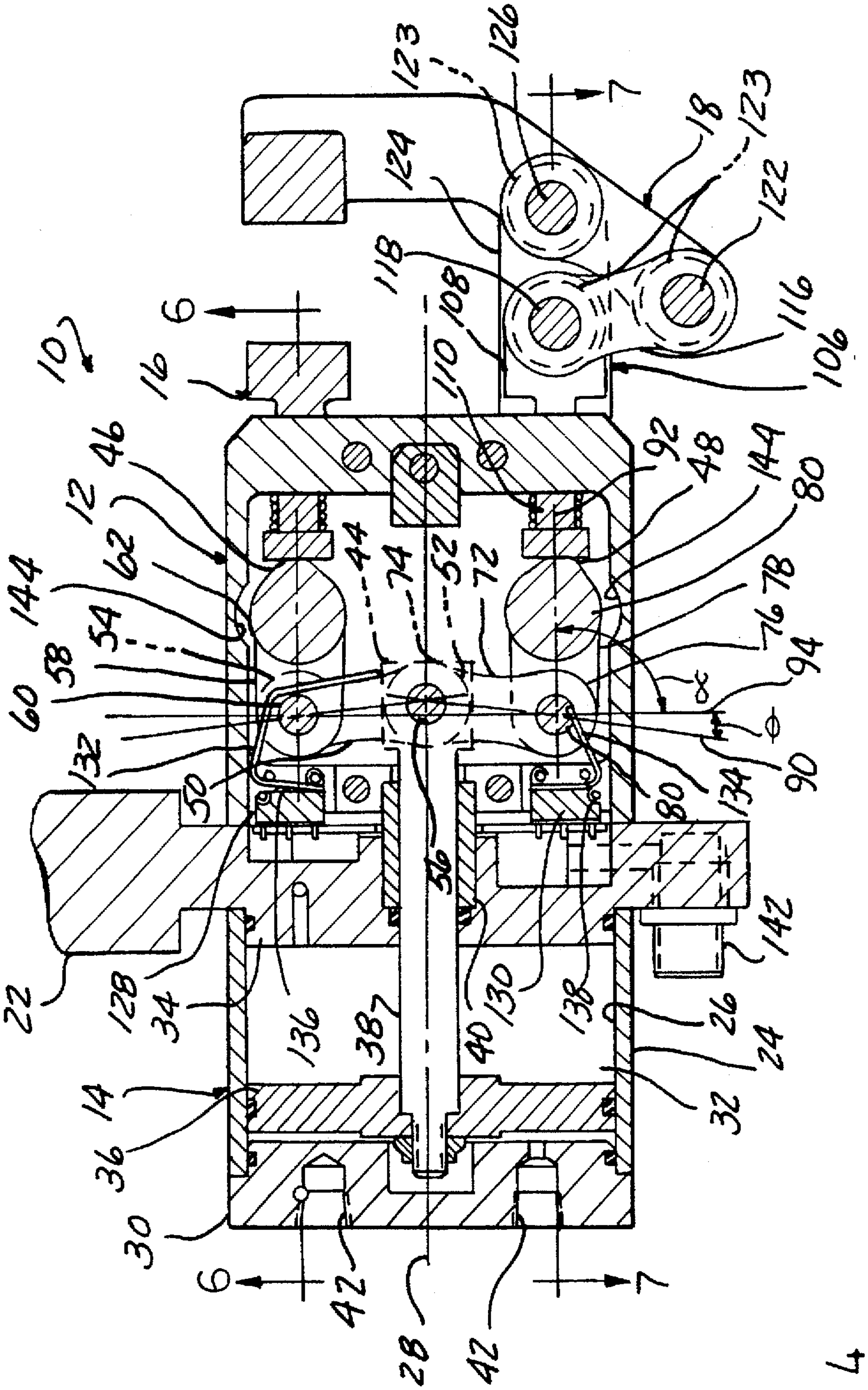
FIG. 4 is a front sectional view showing the gripper in the clamped position.
Figure 5:
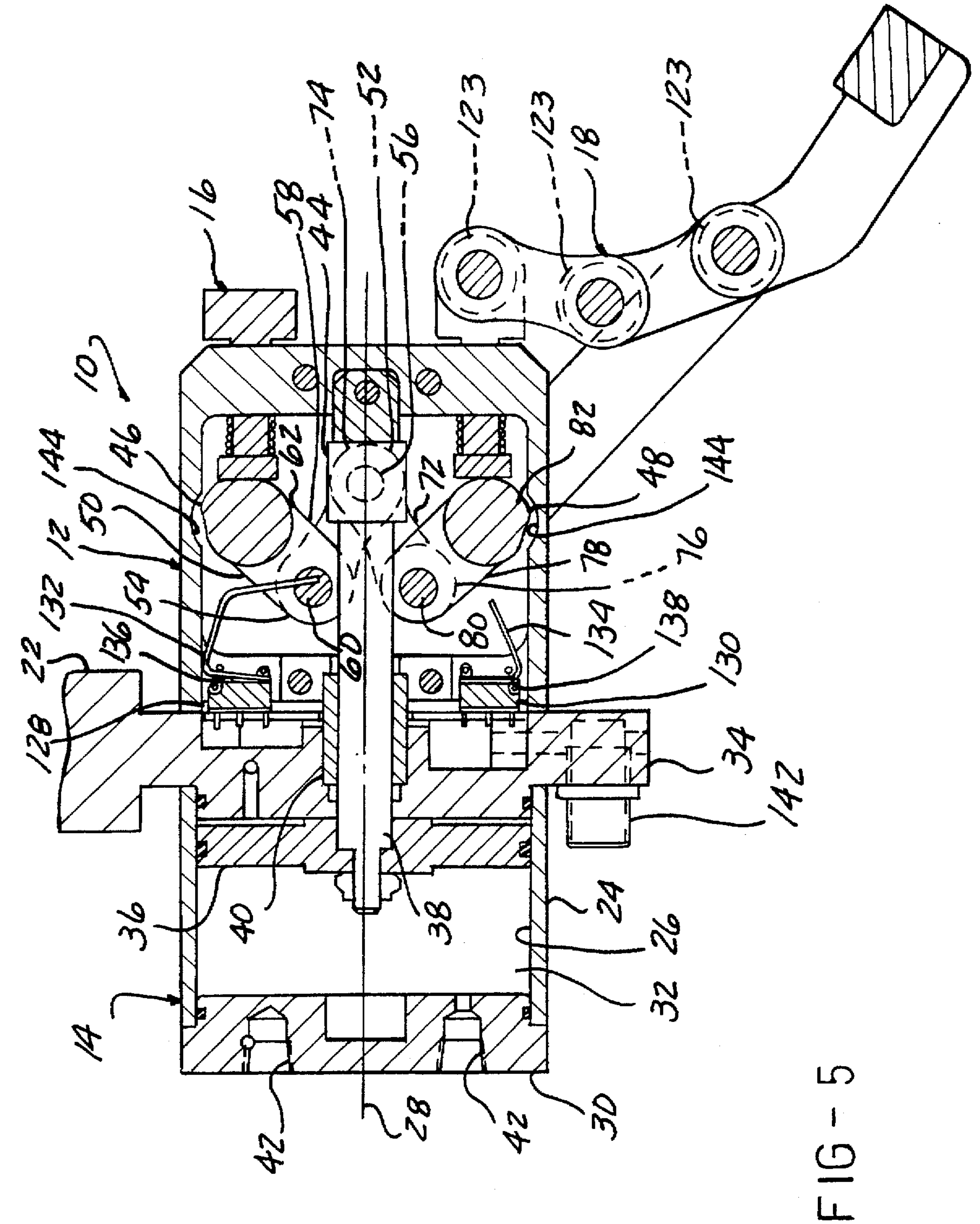
FIG. 5 is a sectioned front view showing the gripper in the unclamped position.

In order for the reciprocating actuator 14 to drive the cam actuating means, a coupling member 44 is connected to the free end of the piston rod 38 for linear movement within the housing 12, as seen in FIGS. 4 and 5. A pivotal linking means pivotally connects the coupling member 44 to an independent first and second cam surface 46, 48 which independently actuates the first and second jaws 16, 18, respectively, between the clamped and unclamped positions.

Figure 6:
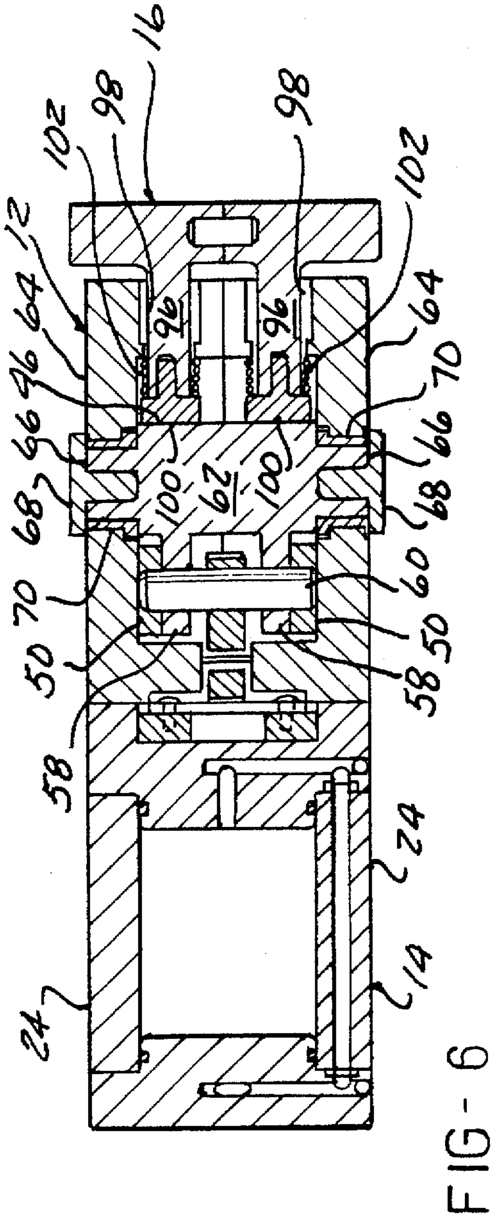
FIG. 6 is a sectional view taken in the direction of arrows 6—6 in FIG. 4 showing the first jaw of the gripper in the clamped position.

As seen in FIGS. 4–6, the pivotal linking means for the first jaw 16 provides a first pair of substantially parallel linkage members 50 having opposite ends 52, 54. Each end 52, 54 of the first pair of linkage members 50 has an aperture extending therethrough. One 52 of the opposite ends of the first pair of linkage members 50 are pivotally connected to the coupling member 44 by a pivot pin 56, wherein the coupling member 44 has an aperture extending therethrough and is placed between the one end 52 of the first pair of linkage members 50 for receiving the pivot pin 56. The other end 54 of the opposite ends of the first pair of linkage members 50 are pivotally connected to a first pair of substantially parallel lever arms 58 wherein the first pair of lever arms 58 provide an aperture therethrough for receiving a pivot pin 60. The first pair of lever arms 58 extend between the first pair of linkage members 50 and are integrally formed with a first shaft link 62. The first shaft link 62 is disposed within the housing 12 and extends across the width of the housing 12 wherein apertures are provided through a side wall 64 of the housing 12. The ends 66 of the first shaft link 62 are flush with the side wall 64 of the housing 12, and a threaded aperture at each end 66 of the first shaft link 62 receives a retaining screw 68 to rotatably secure the first shaft link 62 to the housing 12. Bushings 70 are press-fit into the apertures of the side walls 64 of the housing 12 to enhance and support rotation of the first shaft link 62 within the apertures provided in the side walls 64 of the housing 12.

The first cam surface 46 is disposed within the housing 12 and integrally formed on the outer surface of the first shaft link 62. It should be noted that the present invention is not limited to the cam surface 46 being formed on the shaft link 62, but rather, the cam surface 46 may be a separate piece either pressed on or fastened onto the shaft link 62. The first cam surface 46 is best described as an elliptical knoll configuration which provides for a quick ramping of the first jaw 16 between the clamped and unclamped position.

Figure 7:
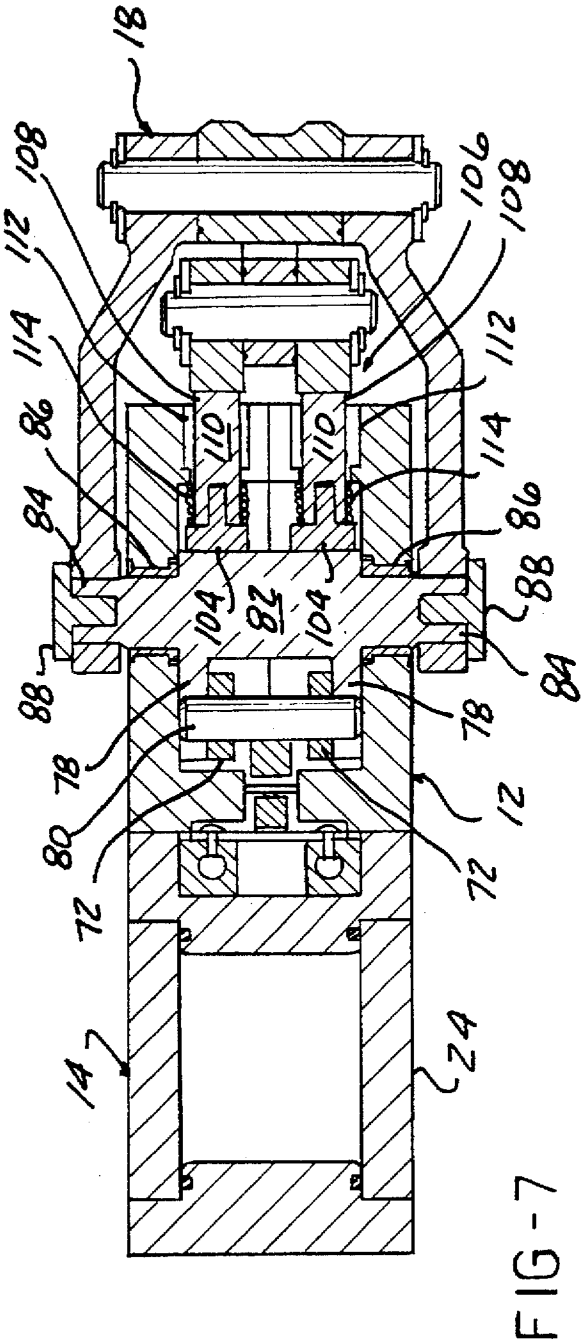
FIG. 7 is a sectional view taken in the direction of arrows 7—7 in FIG. 4 showing the second jaw of the gripper in the clamped position.

As seen in FIGS. 4, 5 and 7, the second jaw 18 is actuated by the cam actuating means wherein the pivotal linking means pivotally links the coupling member 44 to the second cam surface 48. The pivotal linking means also provides a second pair of linkage members 72 having apertured opposite ends 74, 76 with one 74 of the opposite ends pivotally connected to the coupling member 44. The pivot pin 56 utilized to connect the first pair of linkage members 50 also connects the second pair of linkage members 72 as the second pair of linkage members 72 are sandwiched between the coupling member 44 and the first pair of linkage members 50 so that the coupling member 44 lies in the center of the pivotal connection. The opposite ends 74, 76 of the second pair of linkage members 72 are pivotally connected to a second pair of apertured lever arms 78 by a pivot pin 80 wherein the other end 76 of the opposite ends of the second pair of linkage members 72 are both aligned inside and between the second pair of lever arms 78. The second pair of lever arms 78 are integral with and extend from the second shaft link 82. The second shaft link 82 is disposed within the housing 12 but has its ends 84 extending through a pair of apertures provided in the side walls 64 of the housing 12. As in the first shaft link 62, bushings 86 are provided in the apertures in the side walls 64 of the housing 12 to enhance and support rotation of the second shaft link 82 within the housing 12. The ends 84 of the second shaft link are received by a portion of the second jaw 18 which will be described infra. Threaded apertures are provided in the ends 84 of the second shaft link 82 for receiving a pair of retaining screws 88 and securing a portion of the second jaw 18 to the second shaft link 82.

The second cam surface 48 is formed on the second shaft link 82 for actuating the second jaw 18 between the clamped and unclamped positions. As discussed supra, the second cam surface 48 may be fabricated in a number of ways in which it allows the second cam surface 48 to rotate with the second shaft link 82 about a common rotational axis.

It is important to note that the longitudinal axes 90 of the first and second pair of linkage members 50, 72 and the longitudinal axes 92 of the first and second pair of lever arms 58, 78 must always remain at an acute angle a with respect to one another, as seen in FIG. 4, in order to avoid the linkage members 56, 72 from approaching an over-center position with respect to their respective lever arms 58, 78. Preferably, the longitudinal axes 90 of the linkage members 56, 72 are maintained at a 3°–5° angle θ with respect to an axis 94 perpendicular to the longitudinal axes 92 of the respective lever arms 58, 78 in order to avoid the high linkage forces that are created when the linkage members 50, 72 approach the over-center position. Therefore, the gripper 10 provides positive stops to prohibit the coupling member 44 from extending the linkage members 50, 72 to and beyond an over-center position. In the clamped position, the coupling member 44 is retracted with respect to the housing 12 and the piston 36 bottoms out on the end cap 30 to limit the stroke of the coupling member 44. When in the extended or unclamped position, the coupling member 44 abuts a positive stop 96 mounted within the housing 12. The positive stop 96 is fabricated from a urethane block which acts as an abutment to the coupling member 44 when in the unclamped position.

In order to obtain the high gripping forces provided by the invention, both the first and second jaws 16, 18 engage and contract on the workpiece 20 when the cam actuating means engages the first and second jaws 16, 18. As seen in FIG. 6, the first jaw 16 has a pair of legs 96 which extend through a pair of apertures provided in the end of the housing 12. A pair of bushings 98 align the apertures to support linear sliding of the first jaw 16 within the apertures. Within the housing 12, a first pair of cam followers 100 are connected to the free ends of the legs 96 of the first jaw 16. The first pair of cam followers 100 are threaded into the apertured ends of the pair of legs 96 of the first jaw 16. A pair of compression springs 102 bias the first pair of cam followers 100 toward the first cam surface 46 thus biasing the first jaw 16 in a downward or unclamped position.

As seen in FIG. 7, the second jaw 18 has a similar second pair of cam followers 104 with a linkage portion 106 connected to the second pair of cam followers 104. The linkage portion 106 provides a pair of first links 108 having a leg portion 110 which similarly extend through apertures provided in the end of the housing 12 wherein bushing 112 lines each aperture of the housing 12 to support the sliding movement of the pair of first links 108. The second pair of cam followers 104 are similarly threaded into threaded apertures provided in the ends of the leg portion 110 of the pair of first links 108. A pair of compression springs 114 are mounted between the second pair of cam followers 104 and an internal surface of the housing 12 to bias the cam followers 104 toward and against the second cam surface 48 as well as bias the second jaw 18 toward the unclamped position.

Figure 3:
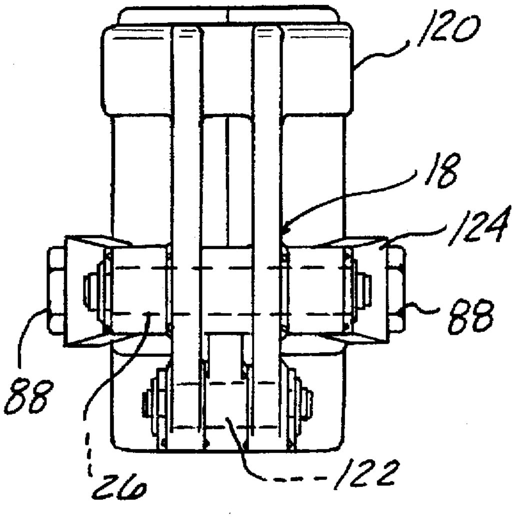
FIG. 3 is a top view showing the second jaw of the gripper in the clamped position.

As seen in FIGS. 3–5, the linkage portion 106 of the second jaw 18 also provides a second link 116 having apertured opposite ends. One of the opposite ends of the second link 116 is pivotally connected to an apertured end of the pair of first links 108 by a pivot pin 118. The other end of the opposite ends of the second link 116 is pivotally connected to a pair of gripping portions 120 provided by the second jaw 18. A pivot pin 122 is utilized to connect the second link 116 to an apertured end of the gripping portion 120 of the second jaw 18. Each of the pivotal connections between the second jaw 18 and the first and second links 108, 116 are sealed by having the second jaw 18 cooperatively engage the first and second links 108, 116 and by utilizing annular seals 123 to prevent contamination from inhibiting pivotal movement. Cooperative engagement between the second jaw 18 and the first and second links 108, 116 is provided by either member having a counterbore for receiving a stepped outer diameter of the other member.

As mentioned supra, a pair of swing arms 124 are utilized to rotatably couple the second shaft link 82, extending from the side walls 64 of the housing 12, to the gripping portion 120 of the second jaw 18 A pivot pin 126 is utilized to connect the free end of the swing arm 124 to a second aperture provided in the mid-portion of the gripping portion 120 of the second jaw 18. Thus, the second jaw 18 has the linkage portion 106 moving linearly while the swing arm 124 simultaneously rotates in reaction to the rotation of the second shaft link 82.

To generate a signal indicating the position of the gripper 10, a sensing means provides a pair of first and second microswitches 128, 130, respectively, disposed within the housing 12, as seen in FIGS. 4 and 5. The microswitches 128, 130 each provide a spring clip 132, 134 extending from a contact switch 136, 138. The spring clips 132, 134 are positioned to make contact with the pivot pins 60, 80 that pivotally connect the first pair of linkage members 50, 72 with the first and second pair of lever arms 58, 78. Thus, when the gripper 10 is in the clamped position, the pivot pin 80 connecting the second pair of linkage members 72 and the second pair of lever arms 78 deflect the spring clip 134 of the second microswitch 130 and closes the contact switch 138 of the second microswitch 130. A signal is produced by the contact switch 138 closing, and a signal is sent through electrical connections leading from the contact switch 138 to a plug 142 mounted in the adapter plate 34. A cable assembly (not shown) may be fitted to the plug 142 to transmit the signal to a programmable controller or central processing unit (not shown). The first microswitch 128 acts in a similar fashion, but the first spring clip 132 deflects and closes the first contact switch 136 when the pivot pin 160 connecting the first pair of linkage members 50 and the first pair of lever arms 58 reaches the unclamped position.

In operation, the power actuated gripper 10 may start in an unclamped position, wherein the first jaw 16 and the second jaw 18 are retracted and open for receiving the workpiece 20. Although the power actuated gripper 10 may be utilized for a plethora of applications, the present invention is best suited for the engagement and holding of a vertical flange of a sheet metal panel. Thus, the vertical flange 20 is properly placed and located on the first jaw 16 so that the vertical flange 20 extends vertically upward between the first jaw 16 and the second jaw 18.

To clamp the vertical flange of the workpiece 20, the reciprocating linear actuator 14 is actuated so as to move the piston 36 and piston rod 38 linearly, thus moving the coupling member 44 from the unclamped position to the clamped position. In doing so, the first and second pair of linking members 50, 72 pivot toward the side walls 64 of the housing 12, and the first and second cam surfaces 46, 48 cam the first and second pair of cam followers 100, 104 of the first and second jaws 16, 18 against the spring biasing force. Simultaneously, the swing arms 124 of the second jaw 18 rotate with their associated shaft links 62, 82 to provide the gripping portion of the second jaw 18 with a rotating arc having a moving rotational axis. By moving the linkage portion 106 of the second jaw 18 linearly and simultaneously rotating the swing arms 124, the second jaw 18 provides a direct opposing gripping force with respect to the first jaw 16, thus creating a relatively high gripping force.

Once the coupling member 44 fully withdraws, and the piston 36 bottoms out on the end cap 30 of the linear reciprocating actuator 14, the second microswitch 130 contacts the pivot pin 80 that pivotally connects the second pair of linkage members 72 to the second pair of lever arms 28 for the second jaw 18. The second microswitch 130 provides a signal that the gripper 10 is in the clamped position. Once the gripper 10 is in the clamped position wherein the first and second jaws 16, 18 engage and hold the workpiece 20, the workpiece 20 may be moved, welded, assembled, processed, etc.

Once the workpiece 20 has been processed and is ready to be released, the reciprocating linear actuator 14 actuates to drive the piston 36 and the piston rod 38 toward the unclamped position wherein the coupling member 44 moves to its extended position. In so doing, the first and second pair of linkage members 50, 72 move toward the center of the housing 12, and the first and second cam surfaces 46, 48 pivot away from the first and second pair of cam followers 100, 104 wherein an arcuate recess 144 is provided in the side wall 64 of the housing 12 to allow the first and second cam surfaces 46, 48 to rotate toward the side wall 64 of the housing 12. As the first and second pair of cam followers 100, 104 follow the first and second cam surfaces 46, 48, the corresponding compression springs 102, 114 bias the first and second pair of cam followers 100, 104 and first and second jaws 16, 18 downward toward the unclamped position.

Simultaneously, the swing arms 124 of the second jaw 18 pivotally rotate with the second shaft link 82 to swing open the gripping portion 120 and avoid contact with the vertical flange of the workpiece 20. A positive stop block 146 is provided at the end of the housing 12 to positively abut the coupling member 44 and establish the unclamped position as well as to prevent the first and second pair of linkage members 56, 72 from extending beyond an over-center position with respect to the first and second pair of lever arms 48, 78. The first microswitch 128 contacts the pivot pin 60 which pivotally connects the first pair of linkage members 50 to the first pair of lever arms 58 on the first jaw 16 side of the gripper 10 and provides a signal that the gripper 10 is in the unclamped position. Both microswitches 128, 130 may be wired to the cable plug 140, 142 wherein the cable assembly may be connected thereto for connection to an indicating means (not shown) or the central processing unit previously discussed.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A power actuated gripper for engaging and holding a workpiece, and said gripper including a reciprocating actuator, said gripper comprising:

opposing means for gripping a workpiece between a clamped position, wherein said opposing gripping means engages and holds said workpiece, and an unclamped position, wherein said opposing gripping means disengages and releases said workpiece;

cam means, connectible to said reciprocating actuator, for actuating at least a portion of said opposing gripping means between said clamped position and said unclamped position, and said cam actuating means having at least one cam surface engaging at least a portion of said opposing gripping means for actuating said portion of said opposing gripping means; and means for pivotally linking said cam surface with said reciprocating actuator, and said pivotally linking means including:

a coupling member connectible to said reciprocating actuator;

at least one linkage member having opposite ends with one of said ends pivotally connected to said coupling member;

at least one lever arm pivotally connected to the other end of said opposite ends of said linkage member; and a shaft link integral with said lever arm and carrying said cam surface for pivotal movement about a common axis.

2. The gripper stated in claim 1, further comprising:

said linkage member and said lever arm each having a longitudinal axis wherein said longitudinal axes remain at an acute angle with respect to one another to prohibit said linkage member from approaching an over-center position.

3. A power actuated gripper for engaging and holding a workpiece, and said gripper including a reciprocating actuator, said gripper comprising:

an enclosed housing coupled to said reciprocating actuator;

opposing means, partially housed within said housing, for gripping a workpiece between a clamped position, wherein said opposing gripping means engages and holds said workpiece, and an unclamped position, wherein said opposing gripping means disengages and releases said workpiece;

cam means, connectible to said reciprocating actuator and housed within said housing, for actuating at least a portion of said opposing gripping means between said clamped position and said unclamped position;

means, disposed within said housing, for biasing said opposing gripping means toward said unclamped position; and at least one cam follower associated with said opposing gripping means for following said cam actuating means wherein said biasing means biases said cam follower toward said cam actuating means wherein said opposing gripping means comprises:

a first jaw movable along a predetermined linear path between said clamped position and said unclamped position; and a second jaw having a linkage portion connected to said cam follower for movement along a predetermined path between said clamped and unclamped positions, and a swing arm pivotally connected to said linkage portion and rotatably coupled to said cam actuating means for rotating said swing arm between said clamped and unclamped positions, and said linkage portion and said swing arm cooperatively engaging for simultaneous movement between said clamped and unclamped positions.

4. A power actuated gripper for engaging and holding a workpiece, and said gripper including a reciprocating linear actuator, said gripper comprising:

a housing connectible to said reciprocating linear actuator;

a coupling member connectible to said reciprocating linear actuator and disposed within said housing for reciprocal movement therein;

first and second jaws partially disposed within said housing for movement between a clamped position, wherein said first and second jaws engage and hold said workpiece, and an unclamped position, wherein said first and second jaws disengage and release said workpiece;

cam means, connected to said coupling member, for actuating at least one of said first and second jaws between said clamped position and said unclamped position in response to reciprocal movement of said coupling member, and said cam actuating means having:

at least one cam surface cooperatively engaging and actuating at least one of said first and second jaws;

means for pivotally linking said cam surface with said coupling member, and said pivotally linking means having:

at least one linkage member having opposite ends with one of said opposite ends pivotally connected to said coupling member;

at least one lever arm pivotally connected to the other end of said opposite ends of said linkage member; and a shaft link integral with said lever arm, and said shaft link carrying said cam surface wherein said shaft link is pivotally connected to said housing for pivotal movement about a common axis.

5. The gripper stated in claim 4, further comprising:

said linkage member and said lever arm each having a longitudinal axis wherein said longitudinal axes remain at an acute angle with respect to one another to prohibit said linkage member from approaching an over-center position.

6. The gripper stated in claim 5, further comprising:

positive stop means, disposed within said housing, for prohibiting said coupling member from traveling beyond said unclamped position and prohibiting said longitudinal axes of said linkage member and said lever arm from extending beyond an acute angle.

7. A power actuated gripper for engaging and holding a workpiece, and said gripper including a reciprocating linear actuator, said gripper comprising:

an enclosed housing connectible to said reciprocating linear actuator;

a coupling member connectible to said reciprocating linear actuator and disposed within said housing for reciprocal movement therein;

first and second jaws partially disposed within said housing for movement between a clamped position, wherein said first and second jaws engage and hold said workpiece, and an unclamped position, wherein said first and second jaws disengage and release said workpiece; and cam means, disposed within said housing and pivotally connected to said coupling member, for actuating at least one of said first and second jaws between said clamped position and said unclamped position in response to reciprocal movement of said coupling member;

said first jaw moveable along a predetermined linear path between said clamped and unclamped positions; and said second jaw having a linkage portion connected to said cam actuating means for movement along a predetermined path and a swing arm pivotally connected to said linkage portion and rotatably coupled to said cam actuating means while outside of said housing wherein said linkage portion and said swing arm cooperatively engage and simultaneously move between said clamped and unclamped positions.

8. The gripper stated in claim 7, wherein said linkage portion comprises:

a pair of first links connected to said cam follower for linear movement between said clamped and unclamped positions;

a second link having opposite ends with one of said opposite ends pivotally connected to said pair of first links; and a gripping portion pivotally connected to the other end of said opposite ends of said second link and pivotally connected to said swing arm.

9. A power actuated gripper for engaging and holding a workpiece, said gripper including a reciprocal linear actuator, said gripper comprising:

a housing connectible to said reciprocating linear actuator;

a coupling member connectible to said reciprocating linear actuator and disposed within said housing for reciprocal linear movement therein;

first and second means for pivotally linking wherein said first and second pivotally linking means are disposed within said housing and connected to said coupling member, and said first and second pivotally linking means having:

at least one linkage member having opposite ends with one of said opposite ends pivotally connected to said coupling member;

at least one lever arm pivotally connected to the other end of said opposite ends of said linkage member; and a shaft link;

first and second means for camming wherein said first and second camming means are rotatable coupled to said housing and pivotally connected to said first and second pivotally linking means, respectively;

first and second jaws partially disposed within said housing for movement between a clamped position, wherein said first and second jaws engage and hold said workpiece, and an unclamped position, wherein said first and second jaws disengage and release said workpiece;

first and second cam surfaces engaging at least one of said first and second jaws;

said shaft link integral with said lever arm and carrying one of said first and second cam surfaces wherein said shaft is pivotally connected to said housing for pivotal movement about a common axis; and said first and second jaws each having a cam follower for cooperatively engaging said first and second cam surfaces, respectively, wherein said first and second jaws are simultaneously actuated, respectively, between said clamped and unclamped positions in response to said reciprocal linear movement of said coupling member.

10. The gripper stated in claim 9, further comprising:

said linkage member and said lever arm each having a longitudinal axis wherein said longitudinal axes remain at an acute angle with respect to one another to prohibit said linkage member from approaching an over-center position.

11. The gripper stated in claim 10 further comprising:

positive stop means, disposed within said housing, for prohibiting said coupling member from traveling beyond said unclamped position and prohibiting said longitudinal axes of said linkage member and said lever arm from extending beyond an acute angle.

12. The gripper stated in claim 9, further comprising:

said first jaw moveable along a predetermined linear path between said clamped and unclamped positions; and said second jaw having a linkage portion connected to said cam follower for movement along a predetermined path and a swing arm pivotally connected to said linkage portion and rotatably coupled to said shaft link from outside of said housing wherein said linkage portion and said swing arm cooperatively engage and simultaneously move between said clamped position and said unclamped position.

13. The gripper stated in claim 12, wherein said linkage portion comprises:

a first pair of first links connected to said cam follower for linear movement between said clamped and unclamped positions;

a second link having opposite ends with one of said opposite ends pivotally connected to said pair of first links; and a gripping portion pivotally connected to the other end of said opposite ends of said second link and pivotally connected to said swing arm.

14. The gripper stated in claim 13, further comprising:

means for pivotally sealing said second link with respect to said first link, said gripping portion with respect to said second link, and said gripping portion with respect to said swing arm.

15. The gripper stated in claim 14 wherein said pivotally sealing means comprises:

a first member having a counterbore;

a second member having an outer periphery cooperatively engaging said counterbore of said first member; and an annular seal placed between said cooperatively engaging surfaces of said first and second members to seal and prohibit contaminants from inhibiting pivotal movement of said second link with respect to said first link, said gripping portion with respect to said second link, and said gripping portion with respect to said swing arm.

* * * * *